United States Patent [19]
Mezger

[11] Patent Number: 4,593,525
[45] Date of Patent: Jun. 10, 1986

[54] METHOD AND APPARATUS FOR OPERATING A PISTON DRIVEN INTERNAL COMBUSTION ENGINE HAVING AN EXHAUST GAS TURBOCHARGER

[75] Inventor: Hans Mezger, Freiberg, Fed. Rep. of Germany

[73] Assignee: Dr. Ing. h.c.F. Porsche Aktiengesellschaft, Fed. Rep. of Germany

[21] Appl. No.: 756,932

[22] Filed: Jul. 19, 1985

Related U.S. Application Data

[63] Continuation of Ser. No. 440,957, Nov. 12, 1982, abandoned.

[30] Foreign Application Priority Data

Nov. 13, 1981 [DE] Fed. Rep. of Germany ....... 3145114

[51] Int. Cl.[4] .............................................. F02B 37/00
[52] U.S. Cl. ................... 60/606; 123/198 DC
[58] Field of Search ................ 60/284, 285, 286, 303, 60/605, 606; 123/198 DC, 198 DB, 334, 335, 320

[56] References Cited

U.S. PATENT DOCUMENTS

| | | | |
|---|---|---|---|
| 2,620,621 | 12/1952 | Nettel | 60/606 X |
| 2,654,991 | 10/1953 | Nettel | 60/606 |
| 2,710,521 | 6/1955 | Nettel | 60/606 X |
| 3,103,780 | 9/1963 | Tryhorn | 60/606 X |
| 3,961,199 | 6/1976 | Bronicki | 60/606 X |

FOREIGN PATENT DOCUMENTS

| | | | |
|---|---|---|---|
| 588160 | 12/1959 | Canada | 60/606 |
| 2133996 | 1/1973 | Fed. Rep. of Germany | 60/285 |

*Primary Examiner*—Michael Koczo
*Attorney, Agent, or Firm*—Craig & Burns

[57] ABSTRACT

An apparatus and method for operating a piston driven internal combustion engine having an exhaust gas turbocharger, provides for the exhaust gases of the cylinders to be conducted to an afterburner chamber and subsequently to the exhaust gas turbine of the turbocharger when the motor vehicle is coasting, i.e., when the motor vehicle and engine are being driven by the vehicle's inertia, with the ignition for the cylinders being turned off and the charging air being introduced into the afterburner chamber. The noncombusted fuel/air mixture from the cylinders is combusted in the afterburner chamber with the additional charging air to thereby bring the turbocharger to its full output for reacceleration of the engine.

3 Claims, 1 Drawing Figure

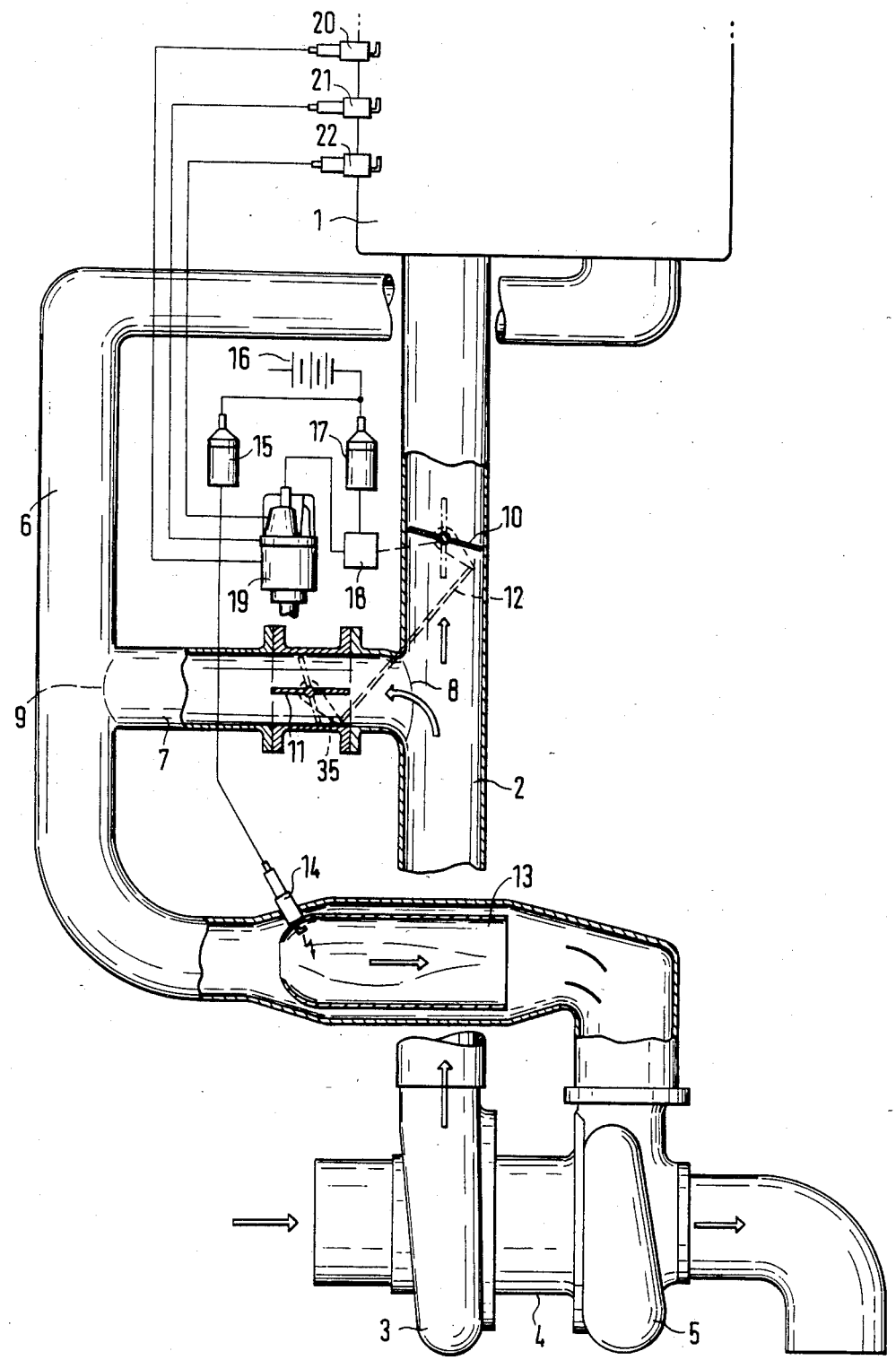

METHOD AND APPARATUS FOR OPERATING A PISTON DRIVEN INTERNAL COMBUSTION ENGINE HAVING AN EXHAUST GAS TURBOCHARGER

This is a continuation of application Ser. No. 440,957, filed Nov. 12, 1982, abandoned.

The present invention relates to a method and apparatus for a piston-type internal combustion engine having an exhaust gas turbocharger, especially for motor vehicles, in which the exhaust gases from the engine are conducted to an afterburner chamber and subsequently to an exhaust gas turbine and in which air being mixed with fuel is blown into the cylinders by means of a turbo-blower driven by an exhaust gas turbine by way of a throttling device.

An internal combustion engine having an exhaust gas turbocharger is disclosed in German Offenlegungsschrift No. 22 07 221. This arrangement is operated in the same general manner and prevents a rapid rotational speed decrease of the turbocharger during the closing of the throttle valve and improves renewed acceleration of the internal combustion engine by fuel being injected into an afterburner chamber arranged ahead of the exhaust gas turbine, the fuel being combusted together with the noncombusted exhaust gas components. The turbocharger acted upon by the exhaust gas does not exhibit any output collapse during the closing of the throttle valve and supplies charging air with a sufficiently high pressure during reacceleration. However, disadvantages with this prior art construction include high fuel consumption by the injection nozzle of the afterburner chamber.

It is an object of the present invention to preclude a rotational speed drop of the turbocharger without additional fuel consumption. This is accomplished by the instant invention by directing the noncombusted fuel-/air mixture of the cylinders into the afterburner chamber when the ignition for the cylinders is turned off and the motor vehicle and engine are being driven by the inertia of the vehicle, e.g., when the vehicle is rolling downhill or decelerating. If, during coasting of the vehicle, i.e., when the inertia of the motor vehicle drives the vehicle and engine, and when the throttle valve closes and the ignition for the cylinders remains turned on, an unnecessary amount of fuel is consumed due to the fact that additional combustion is not required in this operating condition for driving of the vehicle. By turning off the ignition and conducting the noncombusted fuel/air mixture into the afterburner chamber, the fuel energy is used to keep the turbocharger at its rotational speed in order to have available its full output for a subsequent acceleration of the engine RPM. A housing specially constructed or an area within the exhaust gas line between the exhaust gas turbine and internal combustion engine can be used as an afterburner chamber.

In addition to better fuel economy, the method and apparatus according to the present invention provides for a decrease of harmful emissions since the fuel can be combusted more completely in the afterburner chamber than in the cylinders in the lower partial load range present when the motor vehicle and engine are being driven by the inertia of the vehicle.

Advantageously, at the same time, charging air can be branched off from the line from the turbocharger to the cylinders and conducted to the afterburner chamber and a complete combustion can be achieved. The turbocharger circulation thus acts during the coasting operation of the vehicle as storage means for the energy which, according to the prior art method, is consumed needlessly and produces a higher burden for the environment.

Various possibilities for the control of the ignition and branching-off of the charging air exist in accordance with the present invention. Accordingly, the possibilities include the control of the ignition and the branching-off of the charging air may be made dependent on the position of the throttle valve, the pressure of the charging air line and/or the rotational speed of the internal combustion engine. These various possibilities being clearly understood by the skilled artisan once the teachings of the present invention are understood.

These and further objects, features and advantages of the present invention will become apparent from the following description when taken in conjunction with the accompanying drawing which shows, for purposes of illustration only, one embodiment in accordance with the present invention, and wherein:

The single FIGURE is a somewhat schematic view, partly in cross section, of an exhaust gas turbocharging system for a piston-type internal combustion engine suitable for carrying out a method in accordance with the present invention.

Referring now to the single FIGURE of the drawing, the internal combustion engine 1 is supplied with charging air of a higher pressure compared to the atmosphere by way of a charging air line 2 from a supercharging blower or compressor 3 of an exhaust gas turbocharger 4. The supercharging blower or compressor 3 is driven by an exhaust gas turbine 5 which is acted upon by the exhaust gas flow of the exhaust gas line 6. The charging air line 2 and the exhaust gas line 6 are connected with each other by a bypass air line 7 which is connected to the charging air line 2 and to the exhaust gas line 6 at the orifice places 8 and 9 where the bypass line 7 terminates in the charging air line 2 and in the exhaust gas line 6. A throttle valve 10 is installed into the charging air line 2 between the orifice place 8 and the internal combustion engine 1, and is connected with a throttle valve 11 inserted into the bypass line 7 by a linkage 12 that is pivotally secured at both throttle valves 10 and 11. An afterburner chamber 13 is included in the exhaust gas line 6 between the orifice place 9 and the exhaust gas turbine 5. A spark plug 14 is inserted in chamber 13 for controlling ignition therein. The spark plug 14 has the voltage controlled therein by an ignition coil 15 that is connected to a battery 16. A further ignition coil 17 is connected with the battery 16 in parallel to the ignition coil 15; the ignition coil 17 feeds by way of a switch 18 an ignition distributor 19, to which are connected the spark plugs 20, 21, 22 of the internal combustion engine. The switch 18 is connected with the throttle valve 10. The switch 18 is opened and, respectively, closed by the throttle valve 10 depending on its rotational position. Switch 18 can be constructed as microswitch with mechanical contact elements or can be actuatable without the necessity of contacts, so that, beginning with a predetermined rotational position of the throttle valve 10, the ignition connection from the battery 16 of the internal combustion engine 1 is interrupted.

During operation of the internal combustion engine, exhaust gases are conducted by way of exhaust gas line 6 to the exhaust gas turbine 5, with the exhaust gases being recombusted subsequent to leaving the engine 1, but prior to arriving at the exhaust gas turbine 5. The charging blower 3, rotating synchronously with the exhaust gas turbine 5, sucks in fresh air, compresses the same, and supplies the same by way of the charging air line 2 to the internal combustion engine. If the internal combustion engine operates in the full load range, then the throttle valve 10 in the charging air line 2 is opened and the throttle valve 11 in the bypass air line 7 is closed so that the full charging pressure is available to the internal combustion engine. When the internal combustion engine is operated in coasting mode, i.e., the motor vehicle and engine are being driven by the inertia of the vehicle, then the throttle valve 10 is closed and the throttle valve 11 is opened. The charging air is then supplied by way of the bypass air line 7 to the afterburner chamber 13. At the same time, the switch 18 is opened and the ignition of the internal combustion engine is turned off. The resulting noncombusted fuel/air mixture flowing through the engine then flows into the exhaust gas line 6 and is combusted in the afterburner chamber when mixed with charging air to thereby bring the turbocharger to its full output and enable a rapid reacceleration of the internal combustion engine.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A method of operating a piston-driven internal combustion engine of a motor vehicle having an exhaust gas turbocharger, in which exhaust gases from cylinders of the engine are conducted to an afterburner chamber and subsequently to an exhaust gas turbine of the turbocharger and in which air under admixture of fuel is blown into the cylinders of the engine by a charging compressor driven by the exhaust gas turbine by way of a throttling arrangement, comprising the steps of substantially inhibiting the engine combustion process when the engine is being driven by the inertia of the motor vehicle, conducting noncombusted fuel-air admixture from the cylinders into the afterburner chamber, branching off the charging air from a line from the charging compressor to the cylinders of the internal combustion engine and conducting the charging air to the afterburner chamber, controlling the substantial inhibition of the engine combustion process and the branching off of the charging air as a function of the position of the throttling arrangement in the charging air line, and combusting the fuel-air admixture in the afterburner chamber to thereby generally preclude a drop in turbocharger speed.

2. A piston-driven internal combustion engine with an exhaust gas turbocharger, in which exhaust gases from a cylinder of the engine are conducted to an afterburner chamber and subsequently to an exhaust gas turbine of the exhaust gas turbocharger, and in which air under admixture of fuel is blown into the cylinder by a charging compressor driven by the exhaust gas turbine by way of a throttling arrangement, comprising control means operable when the engine is being driven by the inertia of the motor vehicle for substantially inhibiting the engine combustion process and for conducting noncombusted fuel-air admixture from the cylinder into the afterburner chamber, said control means being operable to branch off charging air from a line from the charging compressor means to the cylinder means of the internal combustion engine and to conduct the charging air to the afterburner chamber means when the engine is being driven by the inertia of the vehicle, said control means being operable to control the substantial inhibition of the engine combustion process and to branch off charging air as a function of the position of the throttling arrangement in the charging air line, wherein air-fuel admixture combusted in the afterburner chamber generally maintains turbocharger speed.

3. A piston-driven internal combustion engine with an exhaust gas turbocharger, in which exhaust gases from a cylinder of the engine are conducted to an afterburner chamber and subsequently to an exhaust gas turbine of the exhaust gas turbocharger, and in which air under admixture of fuel is blown into the cylinder by a charging compressor driven by the exhaust gas turbine by way of a throttling arrangement, comprising control means operable when the engine is being driven by the inertia of the motor vehicle for substantially inhibiting the engine combustion process and for conducting noncombusted fuel-air admixture from the cylinder into the afterburner chamber wherein the fuel-air admixture combusted in the afterburner chamber generally maintains turbocharger speed, said control means being operable to control the substantial inhibition of the engine combustion process and branching off of charging air through a line from the charging compressor to the afterburner chamber as a function of the position of the throttling arrangement in the charging air line.

* * * * *